Oct. 1, 1963  C. R. POLLEY  3,105,590
POULTRY FEED CONVEYORS
Filed May 11, 1960  2 Sheets-Sheet 1

INVENTOR
CHARLES R. POLLEY

BY *Naylor & Neal*
ATTORNEYS

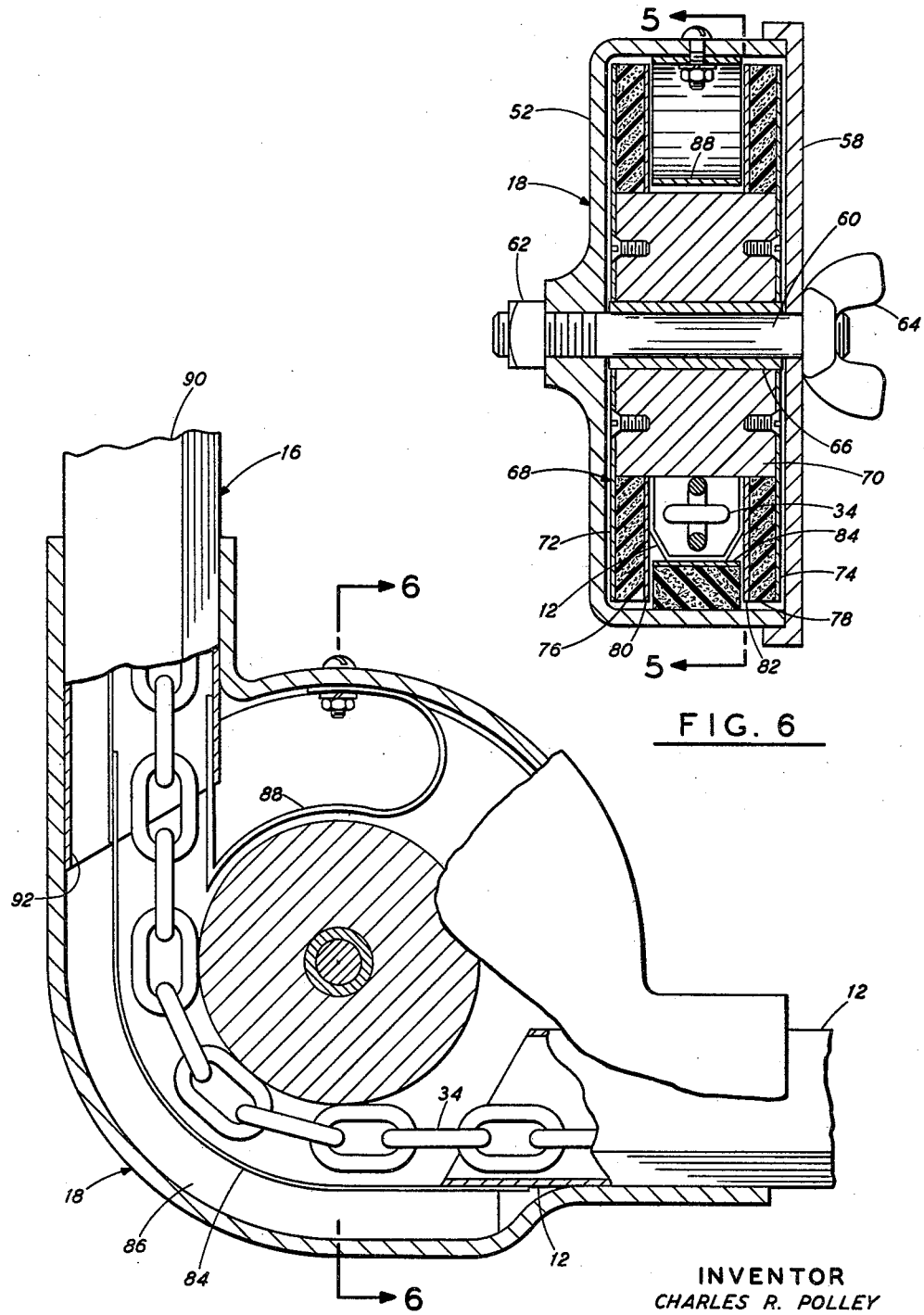

United States Patent Office 3,105,590
Patented Oct. 1, 1963

3,105,590
POULTRY FEED CONVEYORS
Charles R. Polley, Sebastopol, Calif.
(2615 Gravenstein Highway, South Sebastopol, Calif.)
Filed May 11, 1960, Ser. No. 28,444
11 Claims. (Cl. 198—204)

This invention relates to the material conveying art, and more particularly to improvements in the conveying systems of automatic poultry feeders.

The subject invention is particularly suited for use with the automatic poultry feeder described and claimed in my issued patent, No. 2,918,037, granted December 22, 1959. Reference is had to said patent for a disclosure of structural and operational details which may be helpful to an understanding of an environment of use of the present invention.

An object of this invention is to provide new and improved means for conveying poultry feed through right angled turns, or other than right angled turns, either in a horizontal plane or a vertical plane, disposed in the feed conduit system, and to enable this to be done efficiently, i.e., without such jamming of the feed as might be sufficient to put an undue strain on, or freeze, the feed moving element in the conduit.

A further object of the invention is to provide new and improved means for conveying poultry feed in a vertical direction through a feed enclosing conveyor conduit.

Other objects and advantages of the invention will be apparent from the following description taken in conjunction with the drawings forming part of this specification, and in which:

FIG. 5 is an enlarged sectional view of the left hand conduit corner of FIG. 1, the same being taken along lines 5—5 of FIG. 6; and FIG. 6 is a view in section taken along lines 6—6 of FIG. 5.

Figure 1:
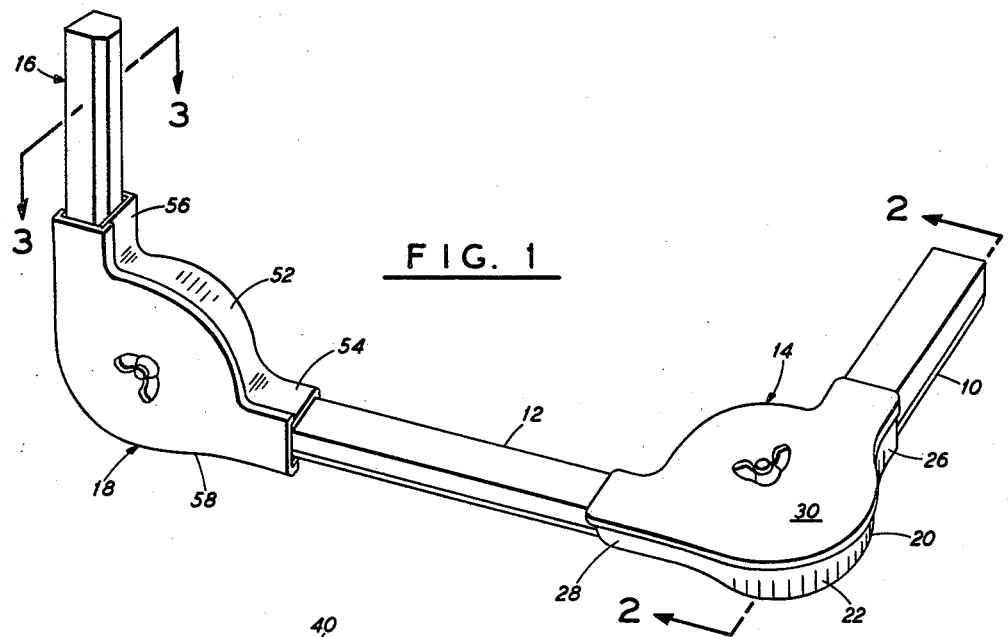
FIG. 1 is a view in perspective of poultry feed conveyor means embodying the subject inventions.
Figure 2:
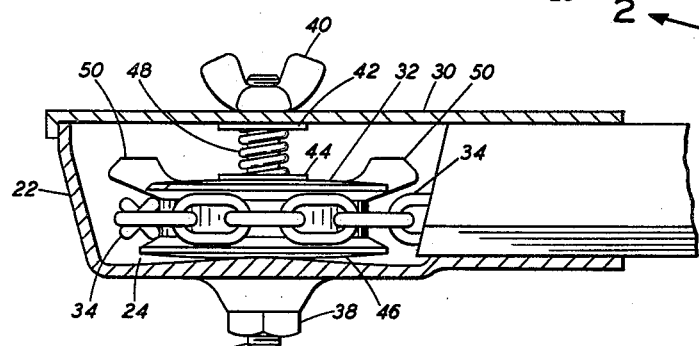
FIG. 2 is an enlarged view in section taken along lines 2—2 of FIG. 1.
Figure 3:
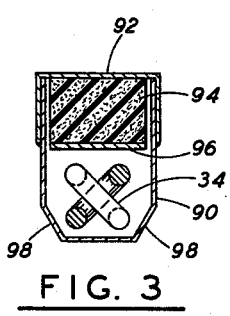
FIG. 3 is an enlarged view in section taken along lines 3—3 of FIG. 1.
Figure 4:
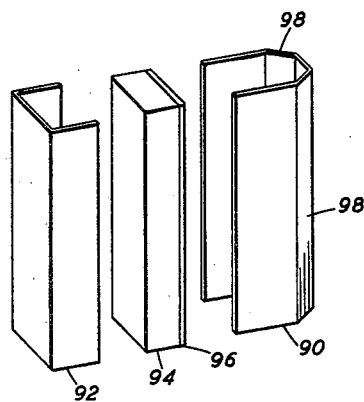
FIG. 4 is an exploded view in perspective of the feed conduit forming elements of FIG. 3.

The conveyor-conduit system portion shown in FIG. 1 comprises horizontally disposed reaches 10 and 12 of tubular conduit, a corner housing 14 interconnecting reaches 10 and 12, a vertically disposed reach 16 of tubular conduit, and a corner housing 18 interconnecting reaches 12 and 16.

Housing 14 comprises a bowl-shaped body portion 20 including a peripheral wall 22, which is inclined outwardly in the upward direction, and a bottom wall 24 which is convexly shaped at its inner side. Body portion 20 is provided with extension portions 26 and 28 into which the ends of conduit reaches 10 and 12 fit. Housing 14 further comprises a removable flanged cover plate portion 30 which is complemental to the plan form of body portion 20.

Rotatably disposed within housing 14 is a sheave 32 around which a flightless conveyor element, such as chain 34, constituting the poultry feed conveyor means, is trained. Sheave 32 is mounted on shaft 36 which extends through wall 24 of the housing and the cover plate 30. Nuts 38 and 40 affixed to the threaded ends of shaft 36 secure the shaft in place and the cover plate to the body of the housing. Disposed between thrust washers 42 and 44 and around shaft 36 above sheave 32 is a compression spring 48, the function of which is to yieldingly urge the convexly shaped underside 46 of the sheave against the convexly shaped bottom wall 24 of the housing.

Extending upwardly and radially from sheave 32 is, preferably, a plurality of vane elements 50.

It will be appreciated that the movement of chain 34 is effective to move poultry feed through the conduit reach 10 into housing 14 and from the latter into and through conduit reach 12. It is the cooperative relationship of the following means which enables passage of the the feed through housing 14 without solidly packing the feed and thereby jamming the sheave and conveyor chain against movement: the outwardly divergent surfaces 24 and 46 which along with the compression spring 48, tend to render the space between said surfaces self-clearing as to feed particles; the outwardly and upwardly inclined inner surface of housing wall 26 which promotes a riding up action of the feed particles between the sheave and wall 22; and the vanes 50 which tend to sweep the housing space above the sheave free of feed particles, impelling them into the outlet throat 28 of the housing.

Housing 18, through which the feed is transferred from horizontal conduit reach 12 to vertical conduit reach 16, comprises a cylindrically shaped body portion 52 having extension portions 54 and 56 into which the ends of conduit reaches 12 and 16 fit. Housing 18 further comprises a removable flanged cover plate portion 58. Housing portions 52 and 58 are secured together by bolt 60 and nuts 62 and 64. Sleeved on bolt 60 is a bushing 66 on which there is rotatably mounted sheave 68. Sheave 68 comprises an annular hub 70, face plates 72 and 74 secured to the hub, compressible foam rubber or plastic discs 76 and 78 bonded to plates 72 and 74, and inner face plates 80 and 82 bonded to the inner sides of discs 76 and 78. Chain 34 is trained around sheave 68, and movement of the chain through housing 18 is effective to rotate sheave 68 and pull the feed material through the housing.

Defining with the facing plates 80 and 82 the path of travel through the housing of the feed is a curved plate 84 which is bonded to a compressible foam rubber or plastic backing strip 86, the latter being bonded to the housing wall. It will be appreciated that the yieldably mounted plate elements 80, 82 and 84 define an expandible throat or passageway for the travel of the feed through the housing. This expansible throat adapts itself to the pressure condition exerted by the feed to prevent jamming of the feed and the freezing of the chain conveyor. Baffle element 88 disposed above sheave 68 in housing 18 prevents the feed from moving around the sheave.

Vertical conduit 16 comprises complemental sections 90 and 92 secured together. Disposed within conduit 16 and secured in place therein, as by bonding to conduit section 92 is a resilient and compressible strip 94 of foam rubber or plastic. A metal facing strip 96 is secured to the strip 94. The function of strip 94 is to yieldably urge facing strip 96 against the feed which fills the space around chain 34 and is moved upwardly thereby. In this manner the degree of feed packing around the chain required to enable the chain to move the feed upwardly within conduit 16 is permitted. The expansible feed passageway defined by the flexibly backed facing strip 96 enables this packing condition to be reached without any freezing of the chain by the feed. The provision of the filleted corners 98 in housing section 90 aid in the prevention of conveyor lock by the feed.

While I have shown and described means enabling trouble-free movement of poultry feed by a flightless conveying element around corners and vertically, it will be appreciated that within the spirit of this invention and the scope of the appended claims variants of the means shown may be employed to move poultry feed up or down an incline, and so forth.

What is claimed is:

1. In a conveyor system for poultry feed and for inhibiting solid packing of the feed during the course of the change in direction thereof, means for changing the direction of horizontal travel of said feed comprising a closed housing having angularly offset inlet and outlet openings, a shaft extending vertically through said housing, a sheave rotatably mounted and axially shiftable on said shaft, spring means yieldingly urging said sheave axially into engagement with the bottom wall of said housing, a movable flightless conveyor element extending through said inlet and outlet openings and trained around said sheave, at least one of the interjacent surfaces constituted by the underside of said sheave and the bottom wall of said housing being convexly shaped to define therebetween a space which is divergent in the radially outward direction, said radially outwardly divergent space in conjunction with said spring means serving to promote the movement of feed out of said space and thereby prevent the solid packing of feed therein.

2. In a conveyor system for poultry feed and for inhibiting solid packing of the feed during the course of the change in direction thereof, means for changing the direction of horizontal travel of said feed comprising a closed housing having angularly offset inlet and outlet openings and having top and bottom and peripheral side walls, a shaft extending vertically through said housing, a sheave rotatably mounted and axially shiftable on said shaft in spaced relation with said top housing wall and in engagement with said bottom housing wall, spring means yieldingly urging said sheave axially into engagement with said bottom wall, a movable flightless conveyor element extending through said inlet and outlet openings and trained around said sheave, at least one of the interjacent surfaces constituted by the underside of said sheave and the bottom wall of said housing being convexly shaped to define therebetween a space which is divergent in the radially outward direction, said peripheral side wall of said housing having an angular inclination outwardly in the upward direction.

3. The combination of claim 2, including at least one vane element carried by said sheave operable during rotation of said sheave to sweep feed in said housing toward said outlet opening.

4. The combination of claim 3, said vane element being disposed at the top of said sheave and extending substantially radially with respect to said sheave.

5. A conveyor system for poultry feed comprising a peripherally imperforate tubular conduit, a movable flightless conveyor element extending longitudinally through said conduit, a wall member disposed interiorly of said conduit, said wall member being normally planar, substantially continuous, and being adapted to define in part a poultry feed passageway through said conduit, means interconnecting said wall member and said conduit operable to support said wall member so that the same is not in pressing engagement with said element, and resilient means interposed between said conduit and wall member adapted to apply substantially uniform pressure over the area of said wall member and adapted to enable yieldable movement of said wall member to enlarge said passageway.

6. A conveyor system for poultry feed comprising a peripherally imperforate tubular conduit, a movable flightless conveyor element extending longitudinally through said conduit, normally planar and substantially continuous resilient wall means disposed within said conduit and adapted to define at least in part a poultry feed passageway through said conduit, said wall means being operable in response to the pressure of feed within said passageway to vary the cross sectional area of said passageway, and means interconnecting said wall means and said conduit operable to support said wall means so that the same is not in pressing engagement with said element.

7. A conveyor system for poultry feed comprising means defining a laterally enclosed conduit, a movable flightless conveyor element extending through said conduit, normally planar and substantially continuous resilient wall means disposed within said conduit and adapted to define at least in part a poultry feed passageway through said conduit, said wall means being operable in response to the pressure of feed within said passageway to vary the cross sectional area of said passageway, and means interconnecting said wall means and said conduit operable to support said wall means so that the same is not in pressing engagement with said element.

8. A conveyor system for poultry feed comprising a first tubular conduit extending substantially horizontally, a second tubular conduit angularly inclined upwardly, a housing interconnecting the adjacently disposed ends of said conduits, a movable flightless conveyor element extending through said conduits and said housing, a rotatable guide member disposed in said housing enabling change of direction movement of said conveyor element between said conduits, resilient and imperforate wall means disposed within said housing in parallel with the path of movement of said element through said housing, said wall means being adapted to define at least in part a poultry feed passageway through said housing and being operable in response to the pressure of feed within said passageway to vary the cross sectional area of said passageway, and means interconnecting said wall means and said housing operable to support said wall means so that the same is not in pressing engagement with said element.

9. The conveyor system of claim 8 including baffle means operable to prevent the travel of feed around said rotatable guide member, said baffle means being disposed above said guide member adjacent the juncture of said second tubular conduit with said housing.

10. A conveyor system for poultry feed comprising a first tubular conduit extending substantially horizontally, a second tubular conduit angularly inclined upwardly, a housing interconnecting the adjacently disposed ends of said conduits, a movable flightless conveyor element extending through said conduits and said housing, a rotatable guide member disposed in said housing enabling change of direction movement of said conveyor element between said conduits, resilient and imperforate wall means disposed both within said housing and said second tubular conduit, said wall means being adapted to define at least in part poultry feed passageways through said housing and said second tubular conduit and being operable in response to the pressure of feed within said passageways to vary the cross sectional area of said passageways, and means interconnecting said wall means with said housing and with said second tubular conduit operable to support said wall means so that the same is not in pressing engagement with said element.

11. The conveyor system of claim 10 including baffle means operable to prevent the travel of feed around said rotatable guide member, said baffle means being disposed within said housing, above said rotatable guide member, and adjacent the juncture of said second tubular conduit with said housing.

(References on following page)

References Cited in the file of this patent

UNITED STATES PATENTS

| | | |
|---|---|---|
| 1,335,076 | Peasley | Mar. 30, 1920 |
| 2,167,818 | Wagner | Aug. 1, 1939 |
| 2,249,588 | Waddle | July 15, 1941 |
| 2,258,429 | Stone | Oct. 7, 1941 |
| 2,297,936 | Ballman | Oct. 6, 1942 |
| 2,383,932 | Brunner | Sept. 4, 1945 |
| 2,513,706 | Baehr | July 4, 1950 |
| 2,529,620 | Marnach | Nov. 14, 1950 |
| 2,712,379 | Kitson | July 5, 1955 |
| 2,738,765 | Hart | Mar. 20, 1956 |
| 2,782,761 | Martin et al. | Feb. 26, 1957 |
| 3,003,464 | Bailey | Oct. 10, 1961 |

FOREIGN PATENTS

| | | |
|---|---|---|
| 708,520 | France | May 4, 1931 |